United States Patent [19]

Lo

[11] Patent Number: 4,926,436

[45] **Date of Patent: * May 15, 1990**

[54] ACCELERATOR FOR COHERENT BOSONS

[75] Inventor: Shui-Yin Lo, Pasadena, Calif.

[73] Assignee: Apricot S.A., Luxembourg, Luxembourg

[ * ] Notice: The portion of the term of this patent subsequent to Oct. 17, 2006 has been disclaimed.

[21] Appl. No.: 231,194

[22] Filed: Aug. 11, 1988

[51] Int. Cl.[5] .............................................. H01S 3/09

[52] U.S. Cl. .......................................... 372/73; 372/5; 372/69

[58] Field of Search .......................... 372/41, 73, 69, 5

[56] References Cited

U.S. PATENT DOCUMENTS 4,626,792 12/1986 Liboff et al. .......................... 372/41

*Primary Examiner*—Léon Scott, Jr.

*Attorney, Agent, or Firm*—Ladas & Parry

[57] ABSTRACT

Accelerator for coherent bosons. Helium clusters are formed by expansion of helium gas through a nozzle into a low pressure chamber. The clusters contain coherent helium particles. Laser light is shone onto the clusters to cause the coherent helium atoms in the clusters to be accelerated by impact of the coherent light from the laser thereon, so that the helium atoms form a high energy coherent beam.

20 Claims, 2 Drawing Sheets

ACCELERATOR FOR COHERENT BOSONS

BACKGROUND OF THE INVENTION (i) Field of the Invention

This invention relates to an accelerator for coherent bosons.

(ii) Prior Art

Traditionally, accelerators are constructed for accelerating charged particles such as electrons, photons and ions. The energy range is in the MeV range for Van der Graff accelerators, up to TeV ($=10^{12}$ eV) for the largest proton accelerator at Fermi National Laboratory, Batavia, Ill., U.S.A. The size of an accelerator increases with energy, for example from a 10 meter tall Van der Graff accelerator to kilometer diameter synchrotrons.

BRIEF DESCRIPTION OF THE INVENTION

According to the present invention there is provided a method of accelerating first bosons comprising colliding those bosons with second energetic coherent bosons to cause the first bosons to form an energetic coherent boson beam.

The invention also provides a particle accelerator for accelerating first bosons comprising means for generating second energetic coherent bosons and directing those to collide with the first bosons and cause these to form an energetic coherent boson beam.

By the present invention it is possible to generate a high energy coherent boson beam without using large structures.

BRIEF DESCRIPTION OF THE ACCOMPANYING DRAWINGS

The invention is further described by way of example only with reference to the accompanying drawings in which.

DETAILED DESCRIPTION

Figure 1:
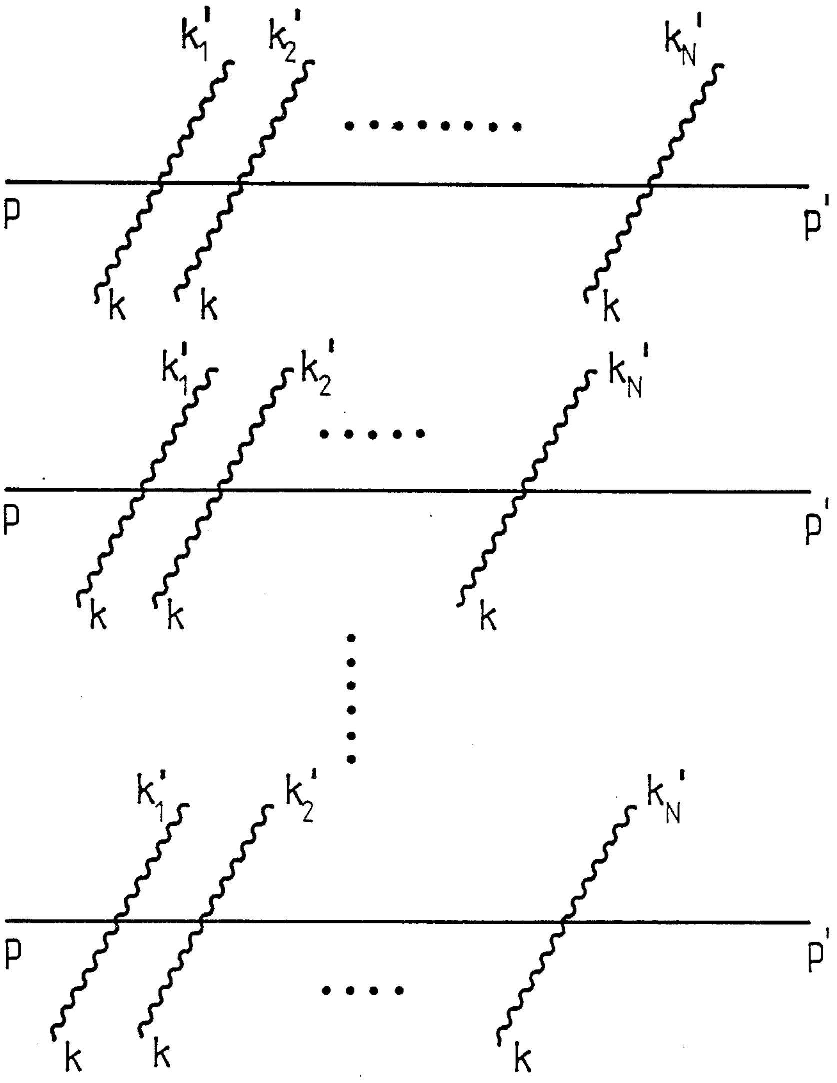
FIG. 1 is a Feynman diagram useful in describing the invention.

The physical mechanism underlying the invention is described in U.S. Ser. No. 035,734 incorporated herein by reference. Using the scattering of coherent laser light with matter at very low temperature, such as Helium II (a superfluid) at below 2.1° K., the reaction is:

$$n_\gamma\gamma(k) + mHe(p) \rightarrow m\gamma(k_j) + \ldots m\gamma(k_n') + MHe(p') \quad \text{(equation 1)}$$

with $n_\gamma$ coherent photons with momentum k from a powerful laser shining on m coherent helium atoms. The m coherent helium atoms will gain energy from the impact of the laser-light and change their momentum from p to p'. The photons will be scattered into N different clusters each with m coherent photons with $mN=n_\gamma$. The N clusters of coherent photons in general have different momentum$=k_1', k_2', k_n'$. The transition rate for equation 1 can be calculated from $n_\gamma$—order perturbation theory in quantum field theory to be approximately:

$$w \cong n_\gamma!\,(m!)^2(m!)^n \left[\frac{n_\gamma!}{(n!)^m m!}\right]^2 [P_1\eta]^{n_\gamma-1}w \quad \text{(equation 2)}$$

For each coherent beam with n particles, there is associated a factor n!. The first n! is for the initial coherent photon beam. The next factorial $(m!)^2$ is for the m initial and final state coherent helium atoms. For N clusters of coherent photons each with m photons in the final state, there is the factor $(m!)^n$. In the final state there are $n_\gamma$ photons distributed into N different clusters with m photons each. The combinational factor is $$n_\gamma!/(N!)^m\, m!$$

Since it is coherent scattering, the combinational occurs in the amplitude, and there is a square to the combinational factor. The probability and transition rate of one photon scattering off one helium atom are denoted by $P_2$ and w and $\eta$ is the inverse of the total number of states available from phase space considerations alone in the final state. Equation 1 can be recast to be:

$$w_1 = z^{n_\gamma}w \quad \text{(equation 3)}$$

with $$z = \frac{n_\gamma^2\, m^2}{e^3} P_1\eta \quad \text{(equation 4)}$$

$$\eta = \frac{\pi}{\omega^2}\,\frac{T}{V};\; P_1 = \frac{\sigma T}{V}$$

where $\sigma$ is the cross section of photon helium elastic scattering ($\sim 10^{-26}$ cm$^2$ for photon with 1 eV energy), $\omega$ the angular frequency of the incoming photon, T the interaction time, V the normalization volume, e is the exponential number, and m is the number of first bosons.

The critical condition is then $z=1$, because of the large value of $n_\gamma$. For $Z<1$, the transition rate w is negligible and for $Z \geqq 1$ the transit ratio w is very large. It is equivalent to the scattering of two macroscopic objects. It occurs with certainty and not with probability.

Figure 2:
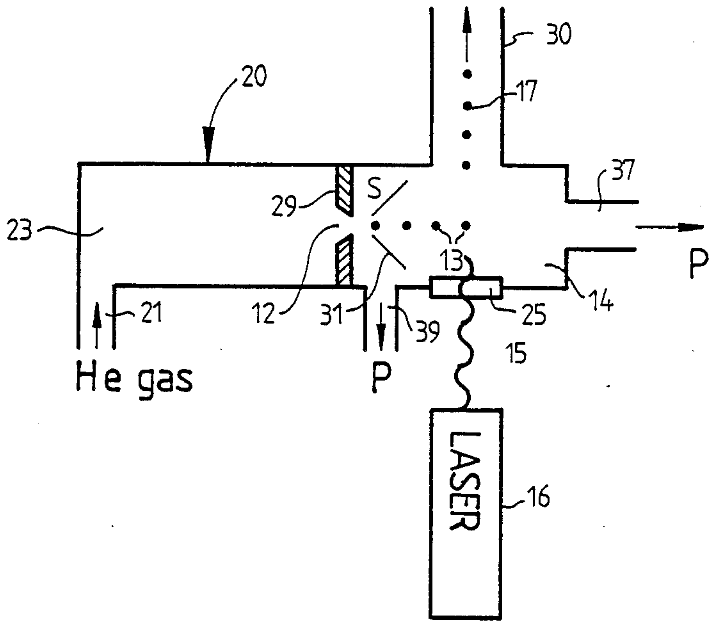
FIG. 2 is a diagram of an apparatus constructed in accordance with the invention.

The helium atoms gain enormous energy. The quantum mechanical Feynman diagram is shown in FIG. 2. The origin of such process is quantum mechanical but the result is a classical phenomenum.

The energy transfer between photons and helium atoms may be estimated. The mass of a helium atom ($m_{He} \sim 3.7$ GeV) is considerably larger than the energy of a photon ($\sim 1$ eV) from a laser. The photon essentially loses very little energy. It may be imagined to be like bouncing off a brick wall. If it bounces backwards, the helium mass gains a momentum $\Delta P \sim 2k$, where k is momentum of the photon. For bouncing N photons, the helium atom gains $$\Delta P \sim Nk \quad \text{(equation 5)}$$

where the factor 2 is dropped for an estimate of the order of magnitude for a nonrelativistic helium atom in the final state, its energy is given by $$E_{He} \sim \frac{\Delta P^2}{2m_{He}} \quad \text{(equation 6)}$$

For relativistic helium atoms in the final state, each helium atom has energy $$E_{He} \sim \Delta P \sim N_k \quad \text{(equation 7)}$$

The larger N is, the higher is the energy that the helium atoms gain. Since $N = n_\gamma/m$, one could increase N by increasing the total energy of each laser pulse or by reducing the number m of the coherent helium atom. FIG. 2 illustrates an experimental setup which will produce an energetic coherent beam of helium atoms.

The helium gas is cooled by liquid helium to low temperatures at high pressure, say one atmospheric pressure. Then the cooled helium gas is allowed to expand through a nozzle 12 into a low pressure chamber 14. During the expansion phase, the helium gas will cool down and helium clusters will be formed. At below 2.1° K., the helium clusters 13 will contain coherent Particles. The number of atoms in a cluster may range from two to thousands, depending, inter alia, on the nozzle size, initial pressure and temperature. When coherent helium clusters are formed, laser light 15 is shone on them from a laser 16. The clusters are accelerated by the impact of the coherent light to form a high energy coherent beam 17 of helium atoms. As shown, the expansion chamber 14 may be formed as part of a vacuum chamber 20, having an inlet 21 at an end opposite the expansion chamber for inlet of the helium gas into a pre-chamber 23. From the pre-chamber 23, the gas Passes through the nozzle 12, formed an opening in a transverse divider wall 29 across chamber 20, and thence into the expansion chamber. Skimmers 31 are shown adjacent nozzle 12 in chamber 14 to direct the emergent clusters of helium. The laser 16 is arranged to direct the light 15 tranversely across the path of the clusters in chamber 14. the light 15 may be introduced through a suitable window 25 of the chamber 14.

The energetic coherent helium beam is exited from the chamber 14 via a side outlet in chamber 14 opposite window 25. Suitable ports 37, 39 may be provided in chamber 14 for pumping out of helium to maintain a low pressure in the chamber 14.

Table 1 tabulates the energies of the final coherent beam from different initial conditions. the total energy of a laser pulse ranges from $10^{-6}$ Joule to $10^3$ Joule. The size of the cluster is assumed to be $m = 10^3$. For one thousand clusters under the influence of one laser light pulse, then $m = 10^6$. The energy $E_{He}$ that the helium atom in a coherent cluster beam attains ranges from $E_{He} = 100$ keV to $10^{19}$ eV. The highest energy $10^{19}$ eV is seven orders of magnitude higher than the highest energy (TeV) obtained in the aforementioned proton accelerator at Fermi National Laboratory. A currently proposed Superconducting Super Collider (SSC) will have a diameter of 60 miles with a maximum energy of 20 TeV. It is difficult to envisage considerable improvement over the SCC by using any conventional accelerating mechanism. However the new mechanism above described is capable of achieving a higher energy. Furthermore the size of this new accelerator may be measured in meters and not in kilometers. Correspondingly, the cost may be several orders of magnitude less than the proposed costs of SSC.

TABLE 1

Energy of helium for different kinds of laser pulse

| Total energy of laser pulse (J) | No. of photons $n_\gamma$ | | N | $E_{He}$ |
|---|---|---|---|---|
| $10^{-6}$J | $10^{13}$ | $m = 10^6$ | $10^7$ | 100 keV |
| | | $= 10^3$ | $10^{10}$ | 10 GeV |
| $10^{-3}$J | $10^{16}$ | $m = 10^6$ | $10^{10}$ | 10 Gev |
| | | $= 10^3$ | $10^{13}$ | 10 TeV |
| 1 J | $10^{19}$ | $m = 10^6$ | $10^{13}$ | 10 TeV |
| | | $= 10^3$ | $10^{16}$ | $10^4$ TeV |
| $10^3$ J | $10^{22}$ | $m = 10^6$ | $10^{16}$ | $10^4$ TeV |
| | | $= 10^3$ | $10^{19}$ | $10^7$ TeV |
| 1 J | $10^{19}$ | $m = 3 \times 10^{14}$, $3 \times 10^4$ | | 0.1 eV |

Table 2 lists the difference between conventional accelerators and the present accelerator for coherent beams.

A high energy coherent boson accelerator can only have a small number of particles. However, for investigating high energy phenomena this presents no problem because the hadron- hadron scattering cross-section will be increased by at least $(m!)^2$ with one factor m! coming from each of the two colliding high energy coherent beams.

For coherent beams, the outcoming beam is not confined to the high energy region at all. If the number m of coherent helium atoms is increased, it is possible to have a low energy coherent beam.

TABLE 2

Different characteristics as between conventional accelerators and coherent boson accelerators

| Characteristics | Conventional Accelerator | Coherent Boson Accelerator |
|---|---|---|
| (1) Range of Energy | $10^6 \sim 10^{13}$ eV | 0.1 eV $10^{19}$ ev |
| (2) Flux | $10^{10}$ per bunch | $m = 10^3$ per cluster or more for low energy |
| (3) Accelerating Mechanism | Electric Field | Momentum transfer from scattering among coherent particles |
| (4) Accelerating Mode | Continuous Acceleration - long distance (10 m 10 km) | One shot - short distance ($<\mu$m) |
| (7) hadron-hadron cross section ($\sigma$) | $\sigma \sim 10^{-26}$ cm$^2$ small | at least $(m!)^2\sigma$ or larger |

In the last column of Table 1 it is noted that for $m = 10^{14}$ one may have $E_{He}$ 0.1 eV, a very low energy coherent helium beam. Low energy beams are useful in investigating molecular and atomic physics.

Typical numerical values associated with the experimental set up as shown in FIG. 2 are now described. The volume of a helium cluster $V_{He}$ is given by $$V_{He} \sim m\gamma_{He}^3$$

$$\gamma_{He} \cong 10^{-8} \text{ cm}$$

The value of the volume V for the photon pulse V is given by $$V = L.A$$

where one chooses the cross section area A and the length of the photon pulse L to be $A = 1$ mm$\times$1 mm $L = 30$ cm for a laser pulse with bandwidth 1 GHz.

so $$\eta = \frac{\pi}{\omega^2} \frac{T}{V}$$

$$P_1 = \sigma_1 \frac{T}{V}$$

where T is about the order of magnitude of the life time of the virtual state of the helium atom excited by one photon. Choose $$T \sim 4 \times 10^{-15} \text{ sec.}$$

$$V \sim \sqrt{V_\gamma V_{He}}$$

$$\sigma_1 \sim 10^{-26} \text{ cm}^2$$

Therefore, $$P_1 \eta \sim 4 \times 10^{-22}$$

For a light pulse of $10^{-7}$ Joule, one has $n=10^{12}$ and for a cluster $m=10^3$. Therefore, the critical value $$Z \sim \frac{n_\gamma^2 m^2 P_1 \eta}{e^2}$$

$$\sim 10^8 > 1$$

is greater than one. If the laser pulse energy is higher, Z remains bigger than one. When $Z>1$, the coherent helium will be accelerated by the impact of the laser pulse.

It is possible to accelerate coherent bosons from a CW (continuous wave) laser. A CW laser emits continuous light which is divided into a series of coherent light pulses, defined by its coherence length. From the accelerated bosons beam's point of view it has received a series of accelerations from a series of coherent light pulses.

It is also possible to accelerate a coherent boson beam by more than one laser. A series of lasers can be placed along the path of the beam and be timed to fire when the coherent beam passes each of the lasers.

A specific example of coherent helium clusters has been given. In principle, any coherent bosons or boson may be accelerated. For example, the cluster could be made up of deuterium at low temperature so long as the critical condition $z \geqq 1$ is satisfied for that particular scattering process. Another example is that the coherent bosons may be the electron pairs called Cooper pairs in superconducting materials. The cluster may then be made up of superconducting materials.

I claim:

1. A method of accelerating a first set of bosons comprised of coherent particles, comprising the steps of colliding a first set of boson clusters having coherent particles with a second energetic set of coherent bosons to accelerate said particles in said first set of bosons to yield an energetic coherent boson beam.

2. The method as claimed in claim 1 wherein the second energetic set of coherent bosons are comprised of at least coherent photons.

3. The method as claimed in claim 2 wherein the first set of boson clusters comprise coherent helium atoms in a superfluid helium liquid.

4. The method as claimed in claim 1 wherein the first set of boson clusters comprise spatially and temporally coherent helium atoms in a superfluid helium liquid, said atoms making up at least some of said particles.

5. A device for accelerating particles comprising:

means for containing a first set of boson clusters having coherent particles;

means for generating an energetic coherent boson beam and directing said energetic coherent boson beam to collide with said first set of bosons to accelerate said first set of bosons and cause said first set of bosons to form an energetic coherent boson beam.

6. A method of accelerating a first set of boson clusters having mass comprising the steps of:

introducing a first set of boson clusters having mass into a contained area;

causing said first set of bosons to form coherent particles;

shining a second set of coherent bosons as a coherent beam on said coherent particles to accelerate said coherent particles and thereby yield an energetic coherent boson beam having mass.

7. The method of claim 6 wherein in said shining of said coherent beam, said coherent beam is a laser beam.

8. The method of claim 6 wherein in said causing step, said first set of bosons are subject to pressure and temperature conditions which cause them to form into said clusters containing said coherent particles.

9. The method of claim 6 wherein in said introducing step, said first set of bosons are introduced into a vacuum chamber having an expansion said first set of bosons entering said vaccuum chamber and passing into said expansion compartment wherein they expand and thereby cool to yield said coherent particles.

10. The method of claim 9 wherein in said shining step, said beam is directed into said expansion compartment to collide with said coherent particles.

11. The method of claim 10 wherein in said shining of said coherent beam, said coherent beam is a laser beam.

12. The method of claim 9 wherein the source for generating said coherent beam of bosons is located outside of said vacuum chamber and is directed to shine through a window in said vacuum chamber in said expansion compartment such that said beam is generally transverse of said coherent particles.

13. The method of accelerating a first set of coherent bosons having mass comprising: colliding a first set of boson clusters having coherent particles with mass with a second energetic set of coherent bosons thereby causing at least said coherent particles having mass to be accelerated to form an energetic coherent boson beam.

14. The method of claim 13 wherein the second energetic coherent bosons comprise coherent photons.

15. The method of claim 13 wherein said first set of boson clusters comprise coherent helium atoms in a superfluid helium liquid, said atoms comprising at least some of said particles.

16. A particle accelerator for accelerating a first set of coherent bosons having mass comprising: means for generating a second energetic beam of bosons and directing said second energetic beam or bosons to collide with a first set of boson clusters having coherent particles with mass to accelerate said first of boson clusters having coherent particles to form an energetic coherent boson beam.

17. A particle accelerator for accelerating bosons having mass, said accelerator comprising:

a vacuum chamber comprised of a section including means for temperature and pressure adjustment such that upon introduction of bosons having mass into said section, proper adjustment of said means of temperature and pressure adjustment causes said bosons having mass to form clusters a containing coherent particles;

means for shining a coherent beam of bosons into said section to collide with said coherent particles to accelerate said particles to form an energetic coherent boson beam.

18. A method as claimed in claim 17 wherein said bosons of said first set comprise helium atoms in superfluid state.

19. A method of accelerating a first set of coherent bosons having mass comprising: colliding a first set of bosons having at least some coherent particles having mass with a second energetic set of coherent bosons to cause at least said coherent particles having mass to form an energetic coherent boson beam, the collision of coherent bosons with non-coherent bosons rendering further coherent bosons, said colliding being effected under the condition such that $z \geqq 1$ where $$z = \text{to} \frac{n_\gamma^2 m^2}{e^5} p_1 \eta \text{ where}$$

$$\eta = \frac{\pi T}{\omega^2 v} \text{ and } p_1 = \frac{\sigma T}{v}$$

$p_1$ is the probability of one boson of said second set scattering off one boson of said first set $w_1$ is the transition rate of one boson of said second set scattering off one boson of said first set is the cross-section of boson elastic scattering for bosons of said second set is the angular frequency of the bosons of said second set T is the interaction time V is the normalization volume e is the exponential number m is the number of first bosons n is the number of bosons of said second set whereby by colliding said first set of coherent bosons with said second set of coherent bosons, said first set is accelerated to form an energetic coherent boson beam.

20. A method as claimed in claim 19 wherein said bosons of said second set comprise photons.

* * * * *

UNITED STATES PATENT AND TRADEMARK OFFICE
CERTIFICATE OF CORRECTION

PATENT NO. : 4,926,436

DATED : May 15, 1990

INVENTOR(S) : Shui-Yin Lo

It is certified that error appears in the above—identified patent and that said Letters Patent is hereby corrected as shown below:

Column 2, line 1, equation 2; please change first occurrence of "w" to --$w_1$--.

Column 2, line 23, change "w" to --$w_1$--.

Column 2, line 25, change "Equation 1" to --Equation 2--.

Column 2, equation 3, between lines 25 and 29, change "$w_1$" to --$w_n$--.

Column 2, at line 42, change "first bosons" to --helium atoms--.

Column 2, line 44, please change "w" to --$w_n$--.

Column 2, line 45, please change "transit ratio w" to --transition ratio $w_n$--.

Column 5, in the equation appearing between lines 25 and 30, please change "$e^2$" to --$e^3$--.

Column 8, please delete lines 11 and 12 which read "$w_1$ is the transition rate of one boson of said second set scattering off one boson of said first set".

Column 8, line 13, please place the symbol --σ-- before the words "is the cross-section of boson elastic".

UNITED STATES PATENT AND TRADEMARK OFFICE

CERTIFICATE OF CORRECTION

PATENT NO. : 4,926,436

DATED : May 15, 1990

INVENTOR(S) : Shui-Yin Lo

It is certified that error appears in the above-identified patent and that said Letters Patent is hereby corrected as shown below:

Column 8, line 14, please place the symbol -- $\omega$ -- before the words "is the angular frequency of the bosons".

Signed and Sealed this

Twenty-eighth Day of July, 1992

*Attest:*

DOUGLAS B. COMER

*Attesting Officer*

*Acting Commissioner of Patents and Trademarks*